(12) United States Patent
Kishimoto

(10) Patent No.: US 8,241,416 B2
(45) Date of Patent: Aug. 14, 2012

(54) INORGANIC WATERBORNE COATING AGENT AND ITS AQUEOUS SOLUTION

(75) Inventor: Katsumi Kishimoto, Osaka (JP)

(73) Assignee: Trade Service Corporation, Yodogawa-Ku (JP)

( * ) Notice: Subject to any disclaimer, the term of this patent is extended or adjusted under 35 U.S.C. 154(b) by 798 days.

(21) Appl. No.: 12/141,237

(22) Filed: Jun. 18, 2008

(65) Prior Publication Data

US 2009/0050018 A1    Feb. 26, 2009

(30) Foreign Application Priority Data

Jun. 21, 2007    (JP) .................. 2007-164269

(51) Int. Cl.
| | |
|---|---|
| C04B 9/02 | (2006.01) |
| C04B 28/26 | (2006.01) |
| C09D 5/16 | (2006.01) |
| C09D 5/18 | (2006.01) |
| C09D 1/00 | (2006.01) |
| C09K 17/02 | (2006.01) |
| A01N 25/00 | (2006.01) |
| A01N 59/26 | (2006.01) |
| A61K 47/00 | (2006.01) |
| A61K 33/42 | (2006.01) |

(52) U.S. Cl. ............... 106/286.8; 106/14.12; 106/286.1; 106/287.29; 106/287.34; 106/18.3; 424/126; 424/601; 424/606

(58) Field of Classification Search ............... 106/286.8, 106/287.34, 287.29, 18.3, 14.12, 286.1; 424/126, 424/601, 606
See application file for complete search history.

(56) References Cited

U.S. PATENT DOCUMENTS

| | | | | |
|---|---|---|---|---|
| 3,050,406 | A | * | 8/1962 | Karlson ............... 106/14.12 |
| 3,130,061 | A | * | 4/1964 | McMahon et al. ...... 106/623 |
| 3,706,579 | A | * | 12/1972 | Michael ............... 106/1.12 |
| 5,296,288 | A | * | 3/1994 | Kourtides et al. ...... 442/178 |
| 2005/0051057 | A1 | * | 3/2005 | Evans et al. .......... 106/287.34 |

FOREIGN PATENT DOCUMENTS

| | | |
|---|---|---|
| JP | 09-057912 A | 3/1997 |
| JP | 2756474 B2 | 5/1998 |
| JP | 2865065 B2 | 3/1999 |
| JP | 11-153701 A | 6/1999 |
| JP | 2924902 B2 | 7/1999 |
| WO | WO-96/29375 A1 | 9/1996 |

* cited by examiner

Primary Examiner — Anthony J Green
Assistant Examiner — Karam Hijji
(74) Attorney, Agent, or Firm — Edwards Wildman Palmer LLP; James E. Armstrong, IV; Junko Harada

(57) ABSTRACT

To provide an inorganic waterborne coating agent and its aqueous solution: wherein, with the surface of the base material highly-hydrophilized, the contaminant such as oil-based contaminant and inorganic dust adhered onto the surface of the base material can be removed easily with water, and at the same time, the antistatic effect can be achieved due to its dust-repelling property; which can be applied by anyone (non-skilled) with ease without considering the base material being organic or inorganic, compared with conventional coating agents, such as photocatalyst and polysilazane-based glass coating agent that have limited range of use; and which has little limit in conditions of use, and is inexpensive and applicable to any places, thereby securing the original goal of antifouling property. To provide an inorganic waterborne coating agent comprising: alkaline colloidal silica, a sodium phosphate compound and a potassium phosphate mixture, and boric acid.

17 Claims, No Drawings

INORGANIC WATERBORNE COATING AGENT AND ITS AQUEOUS SOLUTION

BACKGROUND OF THE INVENTION

1. Field of the Invention

The present invention relates to an inorganic waterborne coating agent which forms a thin, super-hydrophilic, transparent, and inorganic coated layer when applied to the surface of an organic or inorganic base material, and more particularly, to an inorganic waterborne coating agent and its aqueous solution excellent in antifouling property.

2. Description of the Related Art

Coating agents aimed at preventing or reducing fouling of base materials when applied to a coating object such as an organic or inorganic base material, have been well-known. Among such coating agents, a hydrophilic coating agent is well-known for its excellent antifouling property, capable of forming a continuously-wet surface by absorbing water from the air so that the cleaning thereof is facilitated by wiping out the coated surface. The most publicly well-known hydrophilic coating agent is the compound employing titania as a photocatalyst (for example, Japanese Patents No. 2923902, No. 2865065, and No. 2756474 by TOTO Ltd.).

However, the use of a photocatalytic material is limited because: requiring ultraviolet ray; in order to be applied onto an organic base material, requiring various primer treatments for preventing the organic base material from corrosion caused by photocatalytic reaction because the organic base material itself may be decomposed; having difficulty in ensuring its transparency when coating a transparent glass surface (turbidity may occur when the amount of titanium dioxide is increased; the effect may be deteriorated when the amount of titanium dioxide is decreased for higher transparency); and having low adhesion strength to a base material.

Also, as other coating agents for, for example, automobile body surface painting, such as a wax, a polysilazane-based glass coating agent, and a fluorine-based coating agent have been well-known, and they are applied for maintaining gloss and protecting organic coating films. However, an organic substance such as a wax may further amplify the problem of oxidation and organic contamination, thereby requiring to be periodically removed for recoating. Furthermore, oil contained in the wax may leak out due to rainfall, causing black streaks on the automobile body. These black streaks are difficult to be eliminated.

In addition, the polysilazane-based glass coating agent hardens as time goes by, and may cause cracks, peelings and breaks of the surface due to its thinness and/or its coefficient of thermal expansion (CTE) different from that of the automotive organic coating film. Once a crack occurs, it is difficult to repair it as well as to remove the contaminant proceeded thereinto. Also, these polysilazane-based glass coating agents react to and harden from the contact with water in the air (hydrolysis), and thus requiring a particular technique in maintenance and construction thereof, resulting in expensive prices. There are various constraints in the range of use and the construction technique of these coating agents, and moreover, these agents use organic materials as a part of their solvents and binders. As a whole, they cannot be regarded as environmentally friendly or excellent in working environments.

For coating a glass that especially requires transparency and smoothness, these agents are impossible, or at least need a particular skill in handling, and thus can be regarded as impossible for application to such as existing glass and windshield for automobile.

And also, the surface of a windshield for automobile is mainly coated with fluorine-based water repellent, however, since the water repellent is weak against abrasion, it would be easily removed by the operation of windshield wipers. This would cause flaws on the coated surface, resulting in the water repellent becoming rather a reason for adhesion of fouling (such as oil film).

As mentioned above, conventional coating agents have considerable limits in range of use, conditions of use, place of application, time of application, and skill for application, and thus, the prices are necessarily high for users, resulting in a drawback of restricted range of use.

In addition, a stainless-steel as a base material has many advantages such as hardly rusting, having good figure, not needing paint, and thus the total price being inexpensive, and thereby being used in various fields. Stainless-steel is used with patterns produced by hairline, vibration, and blast finish on the surface thereof, for the purpose of design as well as covering prominence of flaws. In this case, prominence of flaws can be suppressed for a certain level, however, a new problem may occur in that fouling adhered on the surface of the stainless-steel are hard to be removed due to many unevenness produced thereon. The stainless-steel is therefore covered with coating of organic clear resin, however, the texture of gloss which a stainless-steel naturally possesses would be deteriorated, and at the same time, organic fouling of the same kind of the resin coating would easily adhere thereon and be hardly removed.

In view of the above problem residing in the prior arts, it is an object of the present invention to provide an inorganic waterborne coating agent and its aqueous solution:
(1) which achieves antifouling effect of the super-hydrophilic property without using titania as a photocatalyst, and, at the same time, does not need ultraviolet ray and can also be applied to an organic base material;
(2) which secures prevention of bad influence to the surface of base material, reduction of environmental loads in the process of manufacturing and applying thereof, and safety to human body;
(3) wherein, with the surface of the base material highly-hydrophilizated, the contaminant such as oil-based contaminant and inorganic dust adhered onto the surface of the base material can be removed easily with water, and at the same time, the antistatic effect can be achieved due to its dust-repelling property;
(4) which can be applied by anyone (non-skilled) with ease without considering the base material being organic or inorganic, compared with conventional coating agents, such as photocatalyst and polysilazane-based glass coating agent that have limited range of use;
(5) which has little limit in conditions of use and is inexpensive and able to be applied to any places, thereby achieving the original goal of antifouling property.

SUMMARY OF THE INVENTION

In order to achieve the above goal, the present invention is composed of the following aspects:

1. An inorganic waterborne coating agent comprising: alkaline colloidal silica, a sodium phosphate compound, and boric acid.

2. An inorganic waterborne coating agent comprising: alkaline colloidal silica, a potassium phosphate compound, and boric acid.

3. An inorganic waterborne coating agent comprising: alkaline colloidal silica, a sodium phosphate compound and a potassium phosphate mixture, and boric acid.

4. An inorganic waterborne coating agent comprising an alkali metal silicate compound added to the above-mentioned inorganic waterborne coating agents in 1 to 3.

5. An inorganic waterborne coating agent aqueous solution comprising water added to the above-mentioned inorganic waterborne coating agents in 1 to 4.

6. An inorganic waterborne coating agent and its aqueous solution, wherein the alkaline colloidal silica is colloidal silica, with silica particles having a single particle size of the range between 3 to 100 nm, or with a mixture of silicas of different particle sizes, dispersed in water and stabilized by sodium dioxide.

The thus-configured present invention can be applied to glasses and mirrors in every field for the purpose of, for example: self-cleaning effect from rain of such as automobiles, exterior walls, and glass windows; removal of contaminant by simple water washing; provision for the organic paint surface with gloss; degradation protection of organic polymer film from ultraviolet ray; and also, antifogging effect of glasses and mirrors; improvement of the permeability of glasses; protection of oil film adhesion onto such as a automobile windshield; remove of finger prints and hair dressing adhered onto such as a window glass of railway vehicle by water washing; and reduction of squamous trace adhesion onto glass surfaces.

In addition, the advanced-hydrophilization of the present invention allows metal surfaces of any kind, such as stainless-steel, titanium material, aluminum, and copper, as well as plated surfaces to be cleaned quite easily with fouling removed by wiping out. The present invention enables stone materials and ceramic wares having smooth surfaces to achieve the same effect as those of metals, and moreover, can be applied to these inorganic base materials by coating process at normal temperature or by baking process according to purposes.

Particularly, regarding the fouling on stainless-steel, the fouling can be easily removed without changes in texture. The present invention provides a completely inorganic coating agent, which is aqueous and durable and may solve earlier problems at once. Additionally, the present invention can be used as a sealer (primer) or a hydrophilic agent (overcoat) for providing adhesion when an alkali metal silicate compound is applied as an antifouling agent to the surfaces of porcelains, exterior wall materials, and building materials composed of inorganic base materials such as stainless-steel and stone material.

And also, application of the present invention onto such as an organic paint surface, a plastic surface, and a screen of television and computer provides gloss, and at the same time, may achieve easy removal of fouling, contamination prevention of devices by preventing static charge, and cooling of these electrical devices using evaporation heat.

Especially, the present invention enables fouling prevention and simple cleaning of: office instruments, mobile telephones, spectacle lenses, decorative desks, counters, artificial marbles, and furniture finished with lacquer or organic coating.

The present invention sufficiently exercises the refractive index as well as the high temperature and high heat resistance performance of silica in, such as, improving illuminance with reflection efficiency enhanced by the application of the present invention to a lighting apparatus, and preventing a reflector inside of an automobile headlight from discoloring and deterioration caused from heat.

DETAILED DESCRIPTION OF THE PREFERRED EMBODIMENTS

In what follows, embodiments of the present invention are described in order to provide sufficient understanding. Additionally, the following embodiments are mere examples of realizing the present invention, having no intention to limit the spirit and scope of the present invention.

A representative embodiment of the present invention is firstly an inorganic waterborne coating agent comprising: alkaline colloidal silica, a sodium phosphate compound, and boric acid (Embodiment 1). Secondly, an inorganic waterborne coating agent comprising: alkaline colloidal silica, a potassium phosphate compound, and boric acid (Embodiment 2). Thirdly, an inorganic waterborne coating agent comprising: alkaline colloidal silica, a sodium phosphate compound and a potassium phosphate mixture, and boric acid (Embodiment 3). Additionally, in the forth place, an inorganic waterborne coating agent comprising an alkali metal silicate compound added to the above-mentioned inorganic waterborne coating agents in 1 to 3 (Embodiment 4). In the fifth place, an inorganic waterborne coating agent aqueous solution comprising water added to the above-mentioned inorganic waterborne coating agents in 1 to 4 (Embodiment 5). Furthermore, in the sixth place, an inorganic waterborne coating agent and its aqueous solution, wherein the alkaline colloidal silica is colloidal silica, with silica particles having a single particle size of the range between 3 to 100 nm, or with a mixture of silicas of different particle sizes, dispersed in water and stabilized by sodium dioxide (Embodiment 6).

Each composition used in Embodiments 1 to 5 is as follows.

In each embodiment, sodium phosphate compound is an elementary substance of or a compound comprised of, such as: monobasic sodium phosphate dihydrate (crystal: $NaH_2PO_4 \cdot 2H_2O$) including sodium phosphate (anhydrous: $NaH_2PO_4$), dibasic sodium phosphate hydrate (crystal: $Na_2HPO_4 \cdot 12H_2O$), trisodium phosphate (anhydrous: $Na_3PO_4$), trisodium phosphate (crystal: $Na_3PO_4 \cdot 12H_2O$), tetrasodium pyrophosphate (anhydrous: $Na_4P_2O_7$), tetrasodium pyrophosphate (crystal: $Na_4P_2O_7 \cdot 10H_2O$), disodium dihydrogen pyrophosphate ($Na_2H_2P_2O_7$), sodium tripolyphosphate ($Na_5P_3O_{10}$), sodium tetrapolyphosphate ($Na_6P_4O_{13}$), sodium hexametaphosphate (($NaPO_3$)n), and sodium acid metaphosphate ($\{Na_xH_y(PO_3)_{x+y}\}n$).

And also, potassium phosphate compound is an elementary substance of or a compound comprised of, such as potassium dihydrogen phosphate ($KH_2PO_4$), potassium dihydrogen phosphate ($K_2HPO_4$), and potassium metaphosphate.

Moreover, any kinds of water: purified water, deionized water, and tap water, may be used.

As silicon dioxide, either alkaline colloidal silica or powder silica in the form of an aqueous solution may be used.

Boric acid in the form of either powder or aqueous solution may be used.

An alkali metal silicate is sodium silicate or potassium silicate, without defining a mole ratio and a concentration of solid content.

An alkaline colloidal silica forms a colloidal state, with amorphous silica particles ($SiO_2$), that have been charged with negative ion, dispersed in water. With silanol group and OH ion existing on the surface of the silica particle, an electric double layer is formed by the alkali ion in alkaline colloidal silica, stabilizing alkaline colloidal silica by using the repelling force between particles.

In the present invention, by means of the matrix of hygroscopic and water holding properties of a sodium phosphate compound or a potassium phosphate compound, moisture in the air is absorbed into the sodium phosphate compound or the potassium phosphate compound. The absorbed moisture is then bound with a hydrophilic group (SiOH and OH) of silica, resulting in a slight amount of moisture held on the coated layer. When rain or water is forcibly added to the coated layer, the formed coated layer develops super-hydrophilic property. The super-hydrophilic property is defined as having the contact angle of less or equal to 10 degrees.

The amount of holding water is adjusted by adjusting the input amount of sodium phosphate compound or potassium phosphate compound. Here, the hydrophilic property develops a water contact angle equal to or less than 15 degrees. The purpose of the use of boric acid is for binding silica particularly with the base material, and at the same time, for pH adjustment of the present coating agent. The mechanism of a photocatalyst forms hydroxyl group by the reaction between ultraviolet ray and $TiO_2$, so that hydrophilic effect is provided to the hydrophilic group in $SiO_2$ in the binder. However, in the present invention, the hydrophilic property is provided by the combination of hygroscopic effect developing materials: sodium phosphate compound, potassium phosphate compound, or the mixture thereof, that hold water by physically absorbing moisture in the air even without ultraviolet ray. Moreover, as a binding cross-linking agent with the base material of $SiO_2$, boric acid ($H_3BO_3$) having extremely high heterobond energy is used.

Development of the hydrophilic effect by a photocatalyst requires ultraviolet ray, and moreover, the moisture for ensuring the effect of the present invention is always present in the air, and therefore, it can not be possible that the effect of the present invention does not develop. In addition, since a formation of an ultra-thin film is possible, an uniform coated layer (ultra-thin film) which is extremely transparent, has no interference fringe, excellent in abrasion resistance can be easily constructed.

A part of an embodiment that shows the most efficient mixing ratio and the concentration of solid content of each material is described later. In the practical example, sodium dihydrogen phosphate is mainly used, however, a potassium phosphate compound or an elementary substance of or a mixture of a sodium phosphate compound and a potassium phosphate compound may be used. Particularly, a sodium phosphate compound is effective in forming a noncurable film, while a potassium phosphate compound is used for forming a curable film. These can be arbitrarily selected according to use conditions and intended purposes.

In the present embodiments, the alkaline colloidal silica having 40.5% of solid content and 10 to 20 nm of particle size ('Snowtex 40' by Nissan Chemical Industries, Ltd.) is used, however, there is no particular specification for the concentration of solid content thereof, and it can be mixed so as to gain a final concentration of solid content of each used material in the inorganic waterborne coating agent. Additionally, the particle size range is between 3 and 100 nm, and in accordance with use and purpose, silica of a single particle size or of a mixture of silica having different particle sizes may be selectively used. The more microscopical the silica particle is, the larger the surface area thereof becomes, and thereby increasing the binding force. These can be arbitrarily selected according to use conditions and intended purposes.

Regarding the materials employed in the embodiments, sodium dihydrogen phosphate ($NaH_2PO_4$) and potassium dihydrogen phosphate in anhydrous powdered state are used because of their high solubility, however, they can be in any state if they are sodium hydrogen phosphate-based compound and potassium phosphate-based compound.

Purified boric acid ($H_3BO_3$) is used for adhesion improvement between the base material and $SiO_2$ and for pH adjustment, however, anhydrous boric acid or boric acid solution may also be used. It can be mixed so as to gain a final concentration of solid content in the inorganic waterborne coating agent.

All the materials described in the claims are possible to dissolve or disperse in water, while being possible to form a coated layer having high-transparency, and overcoming the problem that they might gel-agglutinate during their retention period.

The inorganic waterborne coating agent can be used for coating the surfaces of organic and inorganic base materials with its solid content of the material composition being from 0.1 to 25 w %. Each concentration of solid content is decided in accordance with the intended purposes and use conditions, however, for example, a concentration of solid content of 0.1 to 5% is preferred for an inorganic base material of smooth surface which requires a high refractive index and a high transparency, such as glass, mirrors, and stainless-steel mirror-finished materials. Further a concentration of solid content of 0.5 to 3.5% is more preferred in this case. And also, a concentration of solid content of 0.1 to 10%, and further, 2 to 6% is preferred for an organic coating surface, a colored plastic, a resin product, and a lacquer coating surface.

Regarding sodium silicate, $SiO_2/NaO_2$ having a molar ratio of 2.14, Toku No. 1 sodium silicate by Osaka Keisou, Ltd. is used, however, any products from other manufacturers may be used, without concerning molar ratio. It can be mixed so as to gain a final concentration of solid content in the inorganic waterborne coating agent.

EMBODIMENTS

In what follows, embodiments of an inorganic waterborne coating agent including water in accordance with the present invention are described.

Table 1 shows the compositions and their weights in Embodiments 1 to 4, while Tables 2 and 3 show weight ratios of each composition accounting for the entire inorganic waterborne coating agent including water (an inorganic waterborne coating agent aqueous solution).

TABLE 1

Used amounts of materials

| Materials | Embodiment 1 (g) | Embodiment 2 (g) | Embodiment 3 (g) | Embodiment 4 (g) |
|---|---|---|---|---|
| $NaH_2PO_4$ | 36 | 36 | 10 | 4 |
| $H_3BO_3$ | 4 | 36 | 10 | 18 |
| $SiO_2$ (40.5 w %) | 60 | 120 | 100 | 100 |
| $Si_2O/NaO_2$ | | | | 18 |
| $H_2O$ | 2,800 | 3,167 | 4,073 | 2,934 |

TABLE 2

Weight ratios of solid contents

| | | | | |
|---|---|---|---|---|
| $NaH_2PO_4$ | 36 (55.99%) | 36 (29.85%) | 10 (16.53%) | 4 (5.64%) |
| $H_3BO_3$ | 4 (6.22%) | 36 (29.85%) | 10 (16.53%) | 18 (25.36%) |

TABLE 2-continued

| | Weight ratios of solid contents | | | |
|---|---|---|---|---|
| $SiO_2$ (40.5 w %) | 24.3 (37.79%) | 48.6 (40.30%) | 40.5 (66.94%) | 40.5 (57.06%) |
| $SiO_2/NaO_2$ | | | | 8.478 (11.94%) |
| Totals | 64.3 (100%) | 120.6 (100%) | 60.5 (100%) | 70.978 (100%) |

Details of the materials employed in the above embodiments are as follows.
Silicon dioxide: colloidal silica having a concentration of solid content of 40.5% ('Snowtex 40' by Nissan Chemical Industries, Ltd.)
Sodium dihydrogen phosphate, powder (anhydrous): contained amount of 98% or more (by Taihei Chemical Industrial Co., Ltd.)
Purified boric acid, powder (by Taiyo Chemical Industry Co., Ltd.)
Sodium silicate: Toku 1 sodium silicate having the solid content of 47.1% (by Osaka Keisou Ltd.), 2.14 mol ratio With the above materials, the concentration of solid content (w %) in Tables 2 and 3 were calculated.

When the weight ratio of the solid content excepting water in the inorganic waterborne coating agent aqueous solution described in Claims to the entire inorganic waterborne coating agent aqueous solution is within the range between 0.1 and 25%, the composition is employable, and the above embodiment is merely an representative example of this case.

In addition, the weight ratio of the above-mentioned solid content to the entire inorganic waterborne coating agent aqueous solution was more preferred to be within the range between 0.3 to 8%. From the past experimental results, when the weight ratio was between 0.1 and 0.2%, coating omission would occur depending on how the painting had been performed. On the other hand, when the weight ratio was between 9 and 25%, unevenness in the coated layer thickness would occur, and eliminating operation of the redundant coated layer was required. This was obviously an uneconomical result. However, with the concentration between 0.3 and 8%, the present coating agent was able to be applied, with no coating omission and less fluctuation in coating confirmed.

Embodiment 1 is particularly suitable for an organic base material, for having a greater compounding ratio of $NaH_2PO_4$ and less compounding ratios of $H_3BO_3$ and $SiO_2$ (40.5 w %). Embodiments 3 and 4 are suitable for an inorganic base material, when having a less compounding ratio of $NaH_2PO_4$ and compounding ratios of $H_3BO_3$ and $SiO_2$ (40.5 w %) equivalent to or greater than that of $NaH_2PO_4$ respectively.

Additionally, Embodiment 2 involves greater amount of $NaH_2PO_4$ and $SiO_2$ (40.5 w %), and is able to be applied to both organic and inorganic base materials, having the $H_3BO_3$ amount equivalent to that of $NaH_2PO_4$. This enables, so-called, a multi-use between organic and inorganic base materials.

Embodiment 3 is particularly excellent when applied to an base material which is rich in smoothness and requires a high transparency, and excels in adhesion to inorganic base materials, such as a glass and a mirror.

Embodiment 4 is what applied to inorganic base materials, such as a glass and a stainless-steel, and was then gradually hardened at normal temperature or forcibly hardened with heat application to gain a stronger adhesion. It is suitable for the use under these conditions.

According to the above, when the solid-content weights of the present coating agent is $NaH_2PO_4 > H_3BO_3$ and $NaH_2PO_4 > SiO_2$ (40.5 w %, 24 g of solid content), the coating agent is more suitable for the adhesion to an organic base material, while being more suitable for an inorganic base material when the solid content weights are $NaH_2PO_4 \approx H_3BO_3 \approx < SiO_2$ (40.5 w %). It is appreciated that the pH level varies in accordance with these compounding ratios, and at the same time, that the present coating agent, which is more suitable either for an organic or an inorganic base material, can be selected for use in accordance with a desired ratio, a kind of a coating base material, a level of smoothness or unevenness of the surface, and a use condition.

The pH level is preferred to be near-neutral (pH 7), however, considering acid rain effect, the pH around 5 is the same level as acid rain and would not cause a reaction. Moreover, the greater the pH level is, the stronger the coating agent can be hardened. Consequently, the pH level is desired to be selected from the range between pH 5 and 9 according to the intended use and use condition. However, under a normal condition, the pH level is more desired to be neutral, and thereby being generally selected from the range between pH 6 and 8.

In the case of an organic base material, the adhesion onto the organic base material is required to be more enhanced. This therefore can be solved by increasing the compounding ratio of $NaH_2PO_4$ having viscosity. On the other hand, an inorganic base material has a hydroxyl group on its surface, and sufficiently fulfills its function by increasing the $SiO_2$ amount and by mixing the $NaH_2PO_4$ amount that can be priming water for the continuous holding of hydrophilic property of $SiO_2$.

In short, an inorganic base material has a hydrophilic group in itself, and sufficiently shows hydrophilic performance by a small amount, like priming water, of $NaH_2PO_4$, even when the amount of $SiO_2$ in the inorganic waterborne coating agent is increased. That means, the coating agent for inorganic base materials has a greater amount of $SiO_2$ than of $NaH_2PO_4$, while that for organic base materials has a greater amount of $NaH_2PO_4$ than of $SiO_2$.

Embodiment 1

Production Method for Embodiment 1

In the following, an example of the production method for the inorganic waterborne coating agent according to the present invention is described.

In accordance with the used amount of materials shown in Table 1, 36 g of sodium dihydrogen phosphate powder (anhydrous) (by Taihei Chemical Industrial Co., Ltd.) as an additive agent and 4 g of purified boric acid (Taiyo Chemical Industry Co., Ltd.) were put into a stainless-steel heating container, mixed with approximately 100 g of water, and then heated and stirred. After the material was heated and dissolved until it became transparent and colorless, the weight was measured, and the evaporated water was compensated, so as to gain an additive compound. 60 g of alkaline colloidal silica: 'Snowtex 40' by Nissan Chemical Industries, Ltd. (pH 9 to 10.5, solid content of $SiO_2$: 40.5%, solid content of $NaO_2$: 0.5%) was mixed with 2700 g of adjusted dilution water deducting 100 g of water used for dissolution of the additive agent from the total water amount of 2800 g, and the mixture was sufficiently stirred at normal temperature. The heated and dissolved additive compound was poured hereinto, and then sufficiently stirred to gain an inorganic waterborne coating agent having a pH of 6.0 to 6.5.

For the purpose of avoiding a gelling reaction, alkaline colloidal silica, which has been diluted approximately two times with water, may be poured in gradually as being heated and stirred, and then, after heating and stirring until it became a milky and transparent liquid, adjusted dilution water may be poured in to gain the same coating agent. However, according to the heating temperature and time, gelling of the coating agent may gradually start during the storage period after the production, and the coating agent may turn out to be a milky, highly viscous liquid. This does not matter for its use, however, due to the lack of product stability of the coating agent, colloidal silica is preferably mixed at normal temperature.

The greater the solid content weight ratio of dihydrogen phosphate ($H_2PO_4$) is, the higher the adhesion of the coating agent is, and thus, the coating agent is excellent in adhesion particularly to an organic paint surface. However, when the solid content of $SiO_2$ is decreased extremely, the performance of the antifouling property reduces. Consequently, the blending according to purposes must be conducted within the possible range of material compound of the inorganic waterborne coating agent.

Here, Table 1 shows used amount of each material. Table 2 shows a solid content weight of each material. Each number in parenthesis indicates a weight ratio (w %) of the material accounting for the total amount of the solid content: 100%. Example: In Embodiment 1, both $NaH_2PO_4$ and $H_3BO_3$ are used in a form of powder, having solid content of 100%. As to $SiO_2$, colloidal silica having a concentration of solid content of 40.5 w % is used, and its solid content weight is shown as 24.3 g in Table 2. The total weight of these solid contents is 64.3 g, and each weight ratio of the solid content at the time when the 64.3 g is expressed as 100% is indicated in Table 2 in parenthesis. In Table 3, $NaH_2PO_4$ is divided into Na and $H_2PO_4$, and the total amount of Na that dissolved $NaO_2$ in the colloidal silica is indicated. Accordingly, the total amount in Table 3 is what has been added by only the amount of $NaO_2$ in the colloidal silica to the total amount of solid content in Table 2. (Table 2 is an intermediate calculation sheet for deriving Table 3). Table 3 shows calculations of each weight when a compound is dissolved into a single substance, and at the same time, expressing acidity and alkalescency thereof. It can be a reference for adjusting the pH level of the coating agent according to the blending ratio.

Effect of Embodiment 1

No. 1: The oil stains adhered to an car body were cleansed with a mild detergent, and the detergent was washed away with water. The car body was then dried, and the coating agent was randomly applied to the car body with a spray, before the same amount of water being applied with a spray thereonto. The coating agent was applied evenly, like rubbed into, with a wet cloth that has been tightly wrung, and then the surface was polished with a dried cloth. The applied surface had a gloss, and fouling hardly adhered thereonto when it rained. Even if the fouling adhered, the rain would wash away; even if the fouling remained, the fouling would not form a water-drip shape, and could be easily removed by spraying water and wiping off with a cloth. When it heavily rained, the car looked as if it has been washed, and the contaminant on the coating surface of the car was not prominent, with no spots caused from the fouling. The effect has remained even over eight months, and it is still continuing.

No. 2: A few drops of the coating agent were put into a mobile-phone body made by Matsushita Electric Industrial Co., Ltd. and produced by NTT DOCOMO, Inc., and applied evenly with a dried cloth. Even when finger prints and stains of sebum have adhered onto the surface, they were able to be removed only by wiping out easily with a dried cloth or a Kleenex. A year has already passed since the use of the coating agent had started, however, it was confirmed that the effect has never deteriorated.

No. 3: Some of the coating agent was impregnated into a cloth, and then applied therewith onto a copier by Sharp Co., a plastic chassis of a rotary press by Riso Kagaku Co., and a monitor chassis of a computer by Sanyo Electric Co., Ltd. Though eight months have already passed, the effect of preventing static charge has completely blocked the dingy dirt to adhere onto the plastic chassis unit. Printing ink sometimes adhered particularly onto the rotary press, however, even the ink penetrated into an uneven portion could be easily removed by wiping out with a wet Kleenex or a cloth. In addition, the portion consistently subject to friction has been polished, and increased its gloss.

No. 4: The car body of HIACE by Toyota Motor Co., was washed with a mild detergent to remove oil content on the surface, and the coating agent of the present invention was sprayed randomly thereonto. Then, the same amount of water was sprayed onto the sprayed coating agent, and the agent was applied evenly, like rubbed into, with a firmly wrung wet cloth. Particularly, the paint surface of the long-term used car with its alkyl group deteriorated got very easily coated due to its rough surface. The surface delivered its great hydrophilic

TABLE 3

| | Solid contents (weight ratios) | | | |
|---|---|---|---|---|
| $SiO_2$ | 24.3 (37.58%) | 48.6 (40.06%) | 40.5 (66.28%) | 46.23 (64%) |
| $NaO_2$ | 7.26 (11.2%) | 7.62 (6.28%) | 2.52 (4.12%) | 4.32 (5.98%) |
| $H_2PO_4$ | 29.1 (45.01%) | 29.1 (23.99%) | 8.08 (13.23%) | 3.23 (4.48%) |
| $H_3BO_3$ | 4 (6.19%) | 36 (29.67%) | 10 (16.37%) | 18.45 (25.54%) |
| | | | | |
| Totals | 64.66 (100%) | 121.32 (100%) | 61.1 (100%) | 72.23 (100%) |
| Solid content ratio | 2.31% | 3.83% | 1.5% | 2.44% |
| Intended use | hardening the organic base material at normal temperature | hardening both the organic and inorganic base materials at normal temperature | hardening the inorganic smooth surface base material at normal temperature | baking to harden the inorganic smooth surface base material at normal temperature |
| pH | 6~6.5 | 7 | 6~7 | 8 | property when it rained, with the deteriorated gloss recovered a little. Previously, black drip streaks in the under part of a door mirror had occurred, however, after the coating application, no streak would occur. And also, in view of organic and inorganic contaminant which accumulates on a fine weather, the self-cleaning effect resulted from rain was prominent. Eight months have already passed since the application of the coating agent, and the effect is still continuing.

No. 5: The coating agent was instilled into a cloth, and then, a decorative counter, a desk, and a top board of a kotatsu were coated therewith evenly, before being sufficiently rubbed with a wet cloth that has been tightly wrung, and rubbed finally with a dried cloth. The coated surface became excellently lustrous, and obtained a smooth touch.

Such as finger prints, coffee, ink, and oil droplets from grilled meats were all removed easily by being wiped off with a wet cloth without using a detergent.

Eight months have already passed since the application of the present coating agent, with a decorative counter and a desk at an office; a top board of kotatsu at home, each under a normal use condition, however, such as the antifouling effect and the surface gloss level have never changed.

Embodiment 2

The production method of the coating agent in the following Embodiments 2 to 4 is the same that in Embodiment 1, and the detailed description thereof is omitted.

As a intended use of the coating agent according to Embodiment 2, a large coating area, such as a railway vehicle, was assumed to require the present coating agent to be applied in a short time. An the present coating agent has therefore been developed so as to be capable of being applied to both organic and inorganic base materials (such as glass) at once. The coating agent was required to have the adhesion to an organic base material as a base, and further required to be in the neutrality, taking the alkali level (pH level) of the coating agent relative to a base material (glass), that has much of alkali ion such as natrium, into consideration. Furthermore, the coating agent was required to show an effect on both organic and inorganic base materials, and also, to have, as an essential condition for an used material for railway vehicle, flame retardant property, extremely flame retardant property and noncombustibility. The coating agent has been developed as a material compound that clears the above-mentioned hurdles.

Effect of Embodiment 2

A combustion experiment of railway vehicle materials was conducted at Japan Railway Rollingstock & Machinery Association (JRMA). The coating agent was instilled into a cloth, and then applied therewith onto a paint board of the external wall of Shinkansen bullet train for twice by recoating. As a result, the noncombustibility of the coating agent was approved (the trial combustion of a car material: 18-734K). The coated layer was extremely thin, however, by applying the coating agent onto an organic paint, the noncombustibility effect was confirmed. The application of the coating agent onto an organic paint surface of a railway vehicle also provided an extremely-high disaster prevention property.

It has been confirmed that the adhesive of a protection sheet adhered onto the stainless-steel surface was able to be removed, firstly by removing the protection sheet of the stainless-steel attaching the damage protection sheet, and then by applying the present coating agent with a cloth to which the present coating agent was instilled, as rubbing the stainless-steel surface without using a particular removing chemical. In addition, by applying the coating agent according to the present invention onto a stainless-steel surface, of which the adhesive has been removed, a thin-super-hydrophilic coated layer was able to be formed. The above-mentioned thin-super-hydrophilic coated layer enabled the fouling, such as fingerprints, on the hairline-finished or vibration-finished surface of a stainless-steel to be easily removed with a wet cloth, and the effect was confirmed to remain for a long period of time.

The present coating agent was applied to a hairline-finished stainless steel, and then exposed in the open air for eight months, however, the coating agent showed the super-hydrophilic property when it rained, and such as the adhered dust could be easily removed with water by wiping out, and the effect still remains. No discoloring and no color degradation has been confirmed.

Similar to Embodiment 1, the coating agent was instilled into a cloth, and then applied therewith for twice by recoating: a decorative counter, a desk, an acrylic transparent panel, a FRP (Fiber-Reinforced Plastic) panel, a resin part of a bathroom side wall, a liquid crystal screen of a computer, a resin-made mobile telephone body, a polycarbonate transparent panel, a lacquer finished furniture, and a surface of a dining table. The coated surface was wiped and dried with a dried, soft cloth, and then polished. It took a higher gloss with more polishing. The same level of the antifouling property as Embodiment 1 was able to be obtained.

The coating agent was randomly applied to a windshield surface (15 cm×15 cm) with a spray, and almost the same amount of water was sprayed thereonto. The glass surface was then coated by being rubbed into evenly with a wet cloth that has been tightly wrung. Thus prepared five samples were exposed in the open air. The samples have been exposed in the open air for eight months, however, the coating agent showed the super-hydrophilic property when it rained, and such as the adhered dust could be easily removed with water by being wiped out, and the effect still remains. Additionally, no discoloring and no tarnish of the glass has been confirmed.

The present coating agent is multi-type and applicable to both organic and inorganic base materials. Since its use on an inorganic base material is a fundamental base, the coating agent is set to a high concentration of solid content. And therefore, when the coating agent is applied onto a glass, coating unevenness caused from applying with a cloth might occur due to the greater amount of the adhered solid content. For the purpose of preventing such situation, water was sprayed to dilute the sprayed coating agent, and then the agent was applied. This prevented the occurrence of coating unevenness. However, even when coating unevenness occurred, it was confirmed that wiping them off with a wet cloth easily obtained the transparency.

Antifogging Effect of a Bathroom Mirror

When steam generates in a bathroom, the steam attaches onto a mirror surface. Here, the fogging level of the part contaminated with such as oil on the mirror surface is accentuated, while uniform water-particles attach to the whole part with no contamination. Whether such ubiquity of fouling can be prevented or not was examined.

Firstly, the part to which the fouling is attaching was wiped off with an alkali detergent, mild detergent or a compound that would not damage a glass, and the fouling was washed out. Next, water on the mirror surface was wiped out, and the coating agent of the Embodiment 2 was sprayed randomly thereonto. Then, the same amount of water was sprayed onto the sprayed coating agent, and the coating agent was applied evenly, like rubbed into in manner of wiping cleaning, with a firmly wrung wet cloth. Or, the coating agent may be instilled into a wet cloth that has been wrung and then applied in a similar manner, like rubbed into. Then, coating unevenness caused from applying with a cloth was checked, and if any, wiped out with a wet cloth for amendment. First of all, in bath time, when water was poured on the mirror to wet the whole mirror and cover the mirror surface with super-hydrophilic water film, no fogging on the mirror from steam occurred during the bath time. Shampoos, rinses, and soaps used during the bath and adhered onto the mirror surface were washed out with water, and then, especially those remained in the lower part of mirror, were wiped out with such as a sponge. With such maintenance, the antifogging effect of the coating agent for mirror remained over three months. Particularly, the contamination, such as shampoos, rinses and soaps, on the upper part of the mirror were raised up on the water surface, and then washed down to the lower part only with water due to the hydrophilic effect. However, water flowed out first from the lower part of the mirror, and the oil that was floating on water became a coated layer and remained on the surface of the lower part of the mirror, thereby causing fogging. However, the application of the coating agent can maintain the antifogging effect for a long period of time by forcibly removing those oil coated layer. The coating agent according to the present invention is strong against friction, and may not be removed in a short period of time even when scrubbed with a sponge.

Embodiment 3

The coating agent according to Embodiment 3 can be simply applied to a glass that particularly demands the transparency, or a mirror on which the coating unevenness is easily-noticeable, and moreover, can be applied by an average user in manner of wiping cleaning. The coating agent has been developed as having a level for realizing a sufficient effect. Particularly, for a glass base material which is high in alkali ion such as natrium, the pH level of the coating agent was set between mild acidity and neutrality so as to relieve the alkali attacking generated from the glass itself, and the solid content ratio of alkali was controlled to be less than or equal to 10% of $SiO_2$. Consequently, the glass transparency was ensured, with the reflectivity kept to be less than or equal to 5% (about 2 to 3%), and at the same time, the front visibility improved by 2 to 3%. The prevention of accidents by means of improving the front visibility at night time, the prevention of oil film adhesion, and the easy removal of adhered oil film with water (washer fluid) are required particularly for an automobile windshield, and a coating agent overcoming these intended uses was a goal of Embodiment 3.

In addition, the self-cleaning effect resulted from super-hydrophilic property when it heavily rains is also the object. The super-thin coated layer (less than or equal to 0.5µ) according to the present coating agent was confirmed to have a property in that it may not be easily removed by the friction of such as windshield wipers due to its low friction coefficient.

Furthermore, a coating agent has been obtained that achieves the adhesion particularly to inorganic base materials, such as: glass used in various fields such as general households, buildings, and show cases; mirrors; mirror-finished stainless-steels; surface-finished such as hairline-finished and vibration-finished stainless-steels; and stones. The coating agent may be applied to an organic base material, however, it has been confirmed that the effect was inferior to those of Embodiments 1 and 2.

Effect of Embodiment 3

The coating agent was randomly sprayed onto glass parts of an office door and of a cupboard, and then the same amount of water was sprayed thereonto. With a wet cloth, the coating agent was applied evenly, like rubbed into, and then polished with a dried cloth. Application of the coating agent onto both the front and back surfaces provided the glass surface with more transparency, and such as fingerprints and oil stains were able to be removed by being wiped out with a wet cloth, and moreover, even the heavy contamination could be removed, with water sprayed thereonto and being wiped out with a cloth. Particularly, an indoor use of the coating agent required almost no maintenance, and remained effective by being wiped out with a wet cloth only when it got dirty. The test period has been continuing for a year until the present, and no decreasing of effect has been confirmed.

The coating agent was randomly sprayed onto both the front and back surfaces of an automobile windshield, rear and side glass, a door mirror, and a back mirror, and then, the same amount of water was sprayed thereonto and applied with a wet cloth that has been tightly wrung. A small door mirror and a small back mirror were simply coated with a wet cloth that has been tightly-wrung before the coating agent was instilled thereinto. And then, coating unevenness was checked, and if any, the unevenness portion was wiped out with a wet cloth, and the wiped surface was lightly polished with a dried cloth. In order to check the existence of an uncoated part, water was poured onto the glass surface to reveal any water-shedding part, and if any, it was rubbed with a cloth into which the coating agent has been instilled, and then coated, as fouling being removed. Reapplication of water would confirm its hydrophilic property.

For six months, the rain test involved windshield wipers used twice in a day. When it rained, windshield wipers were used for about two hours for the coated layer consumption test of the coating agent. In addition, the automobile was parked outside when it rained, and the self-cleaning effect of the coating agent for fouling was checked. As a result, the part subject to windshield wipers motion did not show the super-hydrophilic performance when it lightly rained, however, when it heavily rained, it developed the super-hydrophilic property, with no oil film attached thereto and no interference fringe occurred. Even when the accumulated dust and other fouling is to be cleaned, spraying water and wiping out with a dried cloth would quickly dry the surface, and regained the former state of high transparency. The motion of the windshield wipers without using washer fluid would not generate catching that generally occurs in between the wiper's rubber part and the glass surface. This was because the coating agent has caused a slight amount of water in the air to be absorbed onto the glass surface, and no fouling adhered thereonto. The friction resistance on the glass surface was understood to be low in this situation. The coating agent was applied to the body and the glass of a Toyota Corona Mark II, and the car was left in the outdoor parking for the experiment to confirm whether the fouling could be easily removed with water. Even after eight months of being exposed in the outside, no major fouling has been confirmed on the automobile. The reason for this is understood that the self-cleaning effect of the coating agent has been cleansing the accumulated contaminant every time it rained.

As to the cleaning effect, water was put into a spray bottle, and was sprayed onto the automobile. When the fouling was wiped with a dried cloth, it was easily removed. More polishing with a dried cloth increased gloss on the coated surface. As an experimental result, the water amount used for the cleaning was about 150 cc, and the resource saving effect was therefore noteworthy. Moreover, the labor required for the cleaning was one third compared to normal cleaning. In addition, the original coated layer has never been removed, and thus, the original antifouling property was confirmed to be maintained.

Similar to Embodiment 2, the coating agent was randomly applied to a windshield surface (15 cm×15 cm) with a spray, and almost the same amount of water was sprayed thereonto. The windshield surface was then coated by being rubbed into evenly with a wet cloth that has been tightly wrung. Thus prepared five samples were exposed in the open air. The coated windshield surfaces were exposed in the open air for eight months, however, they showed the super-hydrophilic property when it rained, and such as the adhered dust could be easily removed with water by wiping out, and the effect still remains. Additionally, no discoloring and no tarnish of the glass has been confirmed.

The present coating agent was applied to a tile surface of a kitchen wall in a same manner as the glass surface. On the tiles of the kitchen wall, particularly tempura oil and cooking oil are spattered, and these oil stains can not be removed generally without removing oil with a mild detergent and wiping out with a wet cloth and then with a dried cloth. With the present invention applied, it has been confirmed that these oil stains could be easily removed only by wiping out with a wet cloth that has been tightly wrung. And also, application of the present coating agent onto ceramic parts used in such as a washstand made it difficult for the residue of soaps and detergents as well as water stains to adhere thereonto, and even when they adhered, they could be easily removed with water. The gloss and the smoothness on the surfaces were confirmed to have been consistently maintained.

Embodiment 4

The coating agent according to Embodiment 4 was developed for a baking to inorganic base materials such as glass, metals, ceramic wares, porcelains, and stone materials, or, as a primer, for a baking fixing of an alkali metal silicate compound to inorganic base materials. However, the present coating agent is also able to be used at a normal temperature and, as a difference from Embodiments 1, 2, and 3, accelerates hardening even when used at a normal temperature. The fouling removing level is almost the same as those of Embodiments 1, 2 and 3, however, the self-cleaning effect from rains is slightly less due to its less hydrophilic property.

The baking test of the coating agent of Embodiment 4 in a single use was conducted on glass at every 100 degrees C. between 200 and 900 degrees C. At every tested-temperature, the glass surface undergone the baking showed no yellowing, no change on its smoothness and in the contaminant removing level, and particularly, the coating agent undergone the baking for 15 minutes at 600 degrees C. has developed the highest level of fouling removing effect.

In addition, in a burning under a standard condition, that the coating agent was baked to a glass at 350 degrees C. for approximately 12 to 15 minutes in a continuous furnace, the following performances of the coating agent to glass were checked: 1) to control the alkaline component to be less than or equal to 10% of the solid content weight ratio, 2) to keep the glass surface smooth, 3) to maintain the transparency that glass naturally has, 4) to keep the reflectivity within five degrees, 5) to provide strength in the coated layer (peeling and discoloring of a coated layer examined according to Japanese Standards Association: JIS R 3221 Durability Test type A), 6) to have both acid resistance and alkaline resistance, 7) to have a hydrophilic property.

Evaluation Result:
Applying method: polishing finishing with a cloth
Burning condition: 10 minutes at 350 degrees C. (the temperature inside of the furnace: 400 degrees C.)
1) solid content ratio of alkaline component in accordance with the material compound in Embodiment 4 (Table 3): 5.98%
2) glass surface: smooth
3) transparency of the glass: improved by 2.3%
4) reflectivity within 5%: 2.5%
5) strength of the coated layer: JIS R 3221 Durability Test type A It was confirmed that the surface got hardly scratched due to its high hardness, and that the haze value was extremely low. Please refer to Table 4.

TABLE 4

| Strength of the coated layer: JIS R 3221 Durability Test type A | | | |
|---|---|---|---|
| | beginning | rotation: 100 | rotation: 200 |
| Haze | 0.1% | 0.4% | 0.6% |

6) acid and alkaline resistance

As shown in Table 5, no change in the acid and alkaline resistance was confirmed.

TABLE 5

| acid and alkaline resistance | | | |
|---|---|---|---|
| | | Test method | Result |
| acid resistance | $H_2SO_4$ | 1 kmol/m3 × 24 Hrs | No change |
| alkaline resistance | NaOH | 1 kmol/m3 × 24 Hrs | No change |

7) hydrophilic property: the contact angles with water after treatments

As shown in Table 6, the affinity level to water was confirmed to be high. And also, the hydrophilic property was confirmed not to change through water washing. The numbers in Table 6 indicate the contact angles with water.

TABLE 6

| Hydrophilic property: the contact angles with water after treatments | | | | |
|---|---|---|---|---|
| | Water washing | After drying at 50 degrees | Water film formation | After water rewashing |
| Sample 1 | 6.7 | 8 | Yes | 8.2 |
| Sample 2 | 8.9 | 12 | Yes | 9.6 |

When conducting a burning with the coating agent applied onto a stainless-steel (SUS-304) in a similar manner, the burning temperature and time need to be respectively set within the range between 200 and 250 degrees C. (maximum), and between 20 and 60 minutes. When the burning is conducted out of the range of the above-mentioned set temperature, the uncoated portion of the stainless-steel might oxidize and discolor.

In addition, such as a ceramic ware and a porcelain can be burned within the range of the heatproof temperatures of these base materials, with no discoloring and no color degradation.

Effect of Embodiment 4

In the parallel use of the coating agent and an alkali metal silicate compound ($Si_2O/NaO_2$), the test of acid resistance improvement on a porcelain surface has been conducted. When citric acid was dropped onto a porcelain (uncoated), the porcelain surface began to get cloudy in approximately 15 minutes, proving that it was not acid-resistant. With the coating agent according to Embodiment 4 applied onto the porcelain surface to provide the super-hydrophilic property, and with an alkali metal silicate compound applied thereonto (tested by cloth coating and spraying coating), the porcelain surface was burned for 20 minutes at 220 degrees C. Citric acid was then dropped thereonto, however no change has occurred on the porcelain surface.

Similarly, the coating agent was applied onto a tile, and burned at every 100 degrees C. between 200 and 900 degrees C. for testing the level of oil decontamination. Regardless of the burning temperatures, the oil stain could be easily removed with water, and was removed most efficiently when it burned at 220 degrees C. for 30 minutes.

The coating agent was applied onto a ceramic ware in a similar manner, and burned at every 100 degrees C. between 200 and 900 degrees C., for testing the adhesion level of oil stains and metal marks as well as scratch-testing with a knife. Regardless of the burning temperatures, no problem was confirmed in every testing condition, and particularly, the oil stain was removed most efficiently when it burned at 220 degrees C. for 30 minutes.

From the above description, it can be understood that the inorganic waterborne coating agent according to the present invention realizes the effect that the present invention set as the goal, as can be seen from a comprehensive evaluation indicated in Table 7: in the single use at normal temperature in Embodiments 1, 2, 3, and 4; in the parallel use with an alkali metal silicate compound or a modified compound; and in the single use for burning as well as in the parallel use with alkali metal silicate for burning in Embodiment 4. In addition, an alkali metal silicate compound and a modified compound mentioned here are alkaline inorganic waterborne coating agent that has potassium silicate as a base, and is completely inorganic waterborne, not including organic material at all.

TABLE 7

| Comprehensive test result 1 | | | | |
|---|---|---|---|---|
| | Embodiment 1 | Embodiment 2 | Embodiment 3 | Embodiment 4 |
| Contaminant-removing property | Confirmed | Confirmed | Confirmed | Confirmed |
| Gloss | Confirmed | Confirmed | Confirmed | Confirmed |
| Front see-through property | — | Confirmed | Confirmed | Confirmed |
| Adhesion | Confirmed | Confirmed | Confirmed | Confirmed |
| Heating discoloring (900 degrees C.) | No | No | No | No |
| Deterioration from ultraviolet ray | No | No | No | No |
| Texture of base material | No change | No change | No change | No change |
| Deterioration from outdoor exposure | No | No | No | No |
| Wear and deterioration | Extremely solid | Extremely solid | Extremely solid | Extremely solid |
| Change by detergent | No | No | No | No |
| Antistatic property | Confirmed | Confirmed | Confirmed | — |

In addition, as a particularly concrete example, the coating agent according to the present invention was applied to an automobile body, and the result thereof is shown in Table 8 for reference.

TABLE 8

| Conducted tests (sorted by tested subjects) Automobile | | | | |
|---|---|---|---|---|
| | Body paint surface | Glass surface | Wheel | Screen of car navigation system |
| Antifouling property | Removed by water washing and rain | Removed by windshield wipers and rain | Removed by water pressure | Removed with a cloth and wet tissue |
| Residual spot contamination by rain | Extremely little | Extremely little | — | — |
| Front see-through property | | Substantially improved | | |
| Electrostatic contamination | | | | Extremely slight amount |
| Gloss | | | | |
| Cleaning efficiency | Cleaned with a wet cloth | Cleaned with a wet cloth | Cleaned with a wet cloth | |
| Oil film adhesion | Extremely little | Removed by windshield wipers | | |

The coating agent according to the present invention formed a coated layer having noncurable property particularly with the use of sodium phosphate compound, and the coated layer was somewhat rich in flexibility, having a moisturized touch feeling.

Additionally, with the use of potassium phosphate compound, the hardening was gradually accelerated, and the fingerprint adhesion resistance as well as the smoothness on the surface were extremely improved. And also, it was understood that the hardening was accelerated by forcible heating.

Accordingly, it is desired that sodium phosphate compound and potassium phosphate compound are selectively used in accordance with the intended purposes.

It was also confirmed that the coating agent tends to harden when pH is somewhat alkaline (around pH 8), however, the coating agent agglutinates in a preservative solution state when pH level is equal to or greater than the above. In short, a neutral to mildly-alkaline coating agent according to the present invention is understood to be suitable for an inorganic base material.

On the contrary, when the pH level of the coating agent leans to acidity, it easily spreads on an organic base material, delivering excellent noncurability.

It was also confirmed that the finer the silica particle is, the more transparent the solution becomes, thereby increasing the binding force of the coated layer.

Additionally, blending silica particles having different particle sizes was confirmed to improve the density of the coated layer to be formed.

It has been revealed that, on the basis of the above-described test performances, the coating agent and its aqueous solution according to the present invention further contributes to solve the problem of a bridge of water drop caused from the dew condensation (heat discharge efficiency decreases due to the bridge of water drop) that occurs in an evaporator of air-conditioners and in between aluminum fin materials of condensing unit. Moreover, the economical effect of the present invention is extremely distinguishable, such as improving hardness by being applied onto the surface of PET films, and decreasing the friction coefficient of an airframe by being applied onto an airplane body, while at the same time, contributing to the fouling prevention. The present coating agent may contribute much in extremely extensive industrial fields. Other than the above-described fields, uses of the coating agent across to other fields can be developed.

What is claimed is:

1. An inorganic waterborne coating agent to be applied onto the surface of an organic or inorganic base material, wherein the inorganic waterborne coating agent consists of (i) alkaline colloidal silica including water, (ii) a sodium phosphate compound, a potassium phosphate compound, or a mixture of thereof, and (iii) boric acid.

2. An inorganic waterborne coating agent according to claim 1, wherein the blending ratio of the composition is adjusted so that the pH level is between pH 5 and pH 9.

3. An inorganic waterborne coating agent aqueous solution, wherein the inorganic waterborne coating agent of claim 1 is dissolved in water.

4. An inorganic waterborne coating agent aqueous solution according to claim 3, wherein the weight ratio of the solid content excluding water in the inorganic waterborne coating agent aqueous solution to the entire inorganic waterborne coating agent aqueous solution is from 0.1% to 25%.

5. An inorganic waterborne coating agent according to claim 1, wherein the alkaline colloidal silica including water is colloidal silica, with silica particles having a single particle size of the range between 3 and 100 nm, or with a mixture of silica of different particle sizes within the range, dispersed in water and stabilized by sodium dioxide.

6. An inorganic waterborne coating agent aqueous solution according to claim 3 wherein the alkaline colloidal silica including water is colloidal silica, with silica particles having a single particle size of the range between 3 and 100 nm, or with a mixture of silica of different particle sizes within the range, dispersed in water and stabilized by sodium dioxide.

7. An inorganic waterborne coating agent according to claim 2, wherein the alkaline colloidal silica including water is colloidal silica, with silica particles having a single particle size of the range between 3 and 100 nm, or with a mixture of silica of different particle sizes within the range, dispersed in water and stabilized by sodium dioxide.

8. An inorganic waterborne coating agent aqueous solution according to claim 4, wherein the alkaline colloidal silica including water is colloidal silica, with silica particles having a single particle size of the range between 3 and 100 nm, or with a mixture of silica of different particle sizes within the range, dispersed in water and stabilized by sodium dioxide.

9. An inorganic waterborne coating agent according to claim 1, wherein the sodium phosphate compound is a sodium dihydrogen phosphate.

10. An inorganic waterborne coating agent to be applied onto the surface of an organic or inorganic base material, wherein the inorganic waterborne coating agent consists of (i) alkaline colloidal silica including water, (ii) a sodium dihydrogen phosphate, and (iii) boric acid.

11. An inorganic waterborne coating agent according to claim 10, wherein the blending ratio of the composition is adjusted so that the pH level is between pH 5 and pH 9.

12. An inorganic waterborne coating agent aqueous solution, wherein the inorganic waterborne coating agent of claim 10 is dissolved in water.

13. An inorganic waterborne coating agent aqueous solution according to claim 12, wherein the weight ratio of the solid content excluding water in the inorganic waterborne coating agent aqueous solution to the entire inorganic waterborne coating agent aqueous solution is from 0.1% to 25%.

14. An inorganic waterborne coating agent according to claim 10, wherein (i) the alkaline colloidal silica including water is colloidal silica, with silica particles having a single particle size of the range between 3 and 100 nm, or with a mixture of silica of different particle sizes, dispersed in water and stabilized by sodium dioxide.

15. An inorganic waterborne coating agent aqueous solution according to claim 12 wherein (i) the alkaline colloidal silica including water is colloidal silica, with silica particles having a single particle size of the range between 3 and 100 nm, or with a mixture of silica of different particle sizes, dispersed in water and stabilized by sodium dioxide.

16. An inorganic waterborne coating agent according to claim 11, wherein the alkaline colloidal silica including water is colloidal silica, with silica particles having a single particle size of the range between 3 and 100 nm, or with a mixture of silica of different particle sizes, dispersed in water and stabilized by sodium dioxide.

17. An inorganic waterborne coating agent aqueous solution according to claim 13, wherein the alkaline colloidal silica including water is colloidal silica, with silica particles having a single particle size of the range between 3 and 100 nm, or with a mixture of silica of different particle sizes, dispersed in water and stabilized by sodium dioxide.

* * * * *